United States Patent [19]

Pengler

[11] Patent Number: 5,323,799
[45] Date of Patent: Jun. 28, 1994

[54] FULLY MECHANICAL PRESSURE RELIEF SYSTEM

[76] Inventor: Rudolf Pengler, 700 Boulevard E., AB, Weehawken, N.J. 07087

[21] Appl. No.: 27,236

[22] Filed: Mar. 5, 1993

[51] Int. Cl.$^5$ .............................................. F16K 17/00
[52] U.S. Cl. ...................... 137/115; 137/461; 137/492
[58] Field of Search ............ 137/115, 461, 488, 492, 137/492.5

[56] References Cited

U.S. PATENT DOCUMENTS

| Re. 31,845 | 3/1985 | Peters | 137/458 X |
|---|---|---|---|
| 474,711 | 5/1892 | Allan | 137/492 |
| 892,788 | 7/1908 | Wilkins | 251/61.3 X |
| 1,664,493 | 4/1928 | Smith | 137/488 |
| 2,655,935 | 10/1953 | Kinzbach | 137/529 X |
| 4,630,645 | 12/1986 | Spa | 137/625.66 X |

*Primary Examiner*—Gerald A. Michalsky
*Attorney, Agent, or Firm*—Klauber & Jackson

[57] ABSTRACT

A mechanical pressure relief system for a pressurized operating system which is suitable for high purity applications. The pressure relief system utilizes a mechanical logic switch, operable at a set point pressure, in conjunction with a pressurized actuating fluid, completely separated from the processing fluid. The system further utilizes shuttle valves to provide an additional degree of safety, with the minimization of emission of potentially highly hazardous gases, when used in the pressure relief system to prevent further inflow and outflow of processing fluid. Diversion elements are activated, with the pressure logic switch at preselected pressures, for ingress into the system of an actuating fluid. The actuating fluid serves to open venting passageways and to close processing fluid passageways until excessive pressure is relieved. When normal pressure is attained, the pressure logic switch reverses with closing of venting passageways and opening of processing fluid passageways. A belleville spring with a specific eversion pressure characteristic, operates in a fluid tight manner to direct flow of the actuating fluid to operable sites and which reverts to initial position upon pressure relief. Optional safety elements, operated by the actuating fluid, include a manual reset or controlled restart.

3 Claims, 9 Drawing Sheets

FULLY MECHANICAL PRESSURE RELIEF SYSTEM

FIELD OF THE INVENTION

The present invention relates to pressure relief in pressurized systems and particularly to pressure relief in high purity processing systems.

BACKGROUND OF THE INVENTION

High purity processing systems such as those used for processing microcomputer chips and other delicate semi-conductors, have generally required the use of a pressurized inert gas atmosphere such as of argon, or other types of gases such as etching gases, ion implant gases, etc. Many of such gases are also corrosive, flammable, very toxic and require extreme purity to the parts per billion level. The processing gas provides and maintains the sterile conditions required. As a safety measure with such system, as with other gaseous or generally pressurized fluid systems, provision must be made for the safety venting of the fluid or gas under conditions of excessive pressure. Normally such venting is effected by use of a spring loaded valve mechanism such as a poppet which is pushed against a seat by the spring. Excessive pressure build-up, sufficient to overcome the force of the spring, causes the poppet to be removed from the seat and gas to be vented. This system, and those of a similar type, however, inherently permit a degree of leakage wherein the inert processing gas atmosphere is exposed to contaminants from an outside atmosphere, even if only at parts per billion levels. Such micro-level contaminants, while normally of little or no consequence in standard pressurized systems, will detrimentally affect high purity processing systems and particularly those utilized in the manufacture of semi-conductor chips.

SHORT DESCRIPTION OF THE INVENTION

It is an object of the present invention to provide a high leak resistant venting system.

It is a further object of the present invention to provide such system for use in processing systems requiring substantially total purity in a pressurized processing gas atmosphere.

It is another object of the present invention to utilize a pneumatic activation system with pressure logic control, which pneumatic activation system controls venting of the inert pressurized processing gas while being totally separated therefrom.

It is a still further object to provide such system having only mechanical and not electrical actuators and sensors.

It is yet another object of the present invention to provide a system which further isolates pressurized gas input and outlet during said venting and which may require resetting for continued operation.

These and other objects, features and advantages of the present invention will become more evident from the following discussion and drawings in which:

SHORT DESCRIPTION OF THE DRAWINGS

DETAILED DESCRIPTION OF THE INVENTION

Generally the present invention comprises a mechanical pressure relief system for an operating or processing system having a pressurized processing fluid such as an inert gas flowing through processing fluid passageways. The pressure relief system comprises mechanical pressure logic switch means situated within the operating system whereby it is exposed to the pressurized processing fluid. The mechanical pressure logic switch means is activated at a pre-determined set point pressure above that of the normally pressurized processing fluid. The system further comprises actuating fluid means; actuating fluid passageways, completely separate from the processing fluid passageways; and processing fluid flow valve control means which are activated by said actuating fluid. At the pre-determined set point pressure, the pressure logic switch means mechanically moves to allow access of the actuating fluid to the valve processing fluid flow control means, which in turn causes diversion of the processing gas to a system vent. With return of the processing system pressure to the set point, the pressure logic switch means cuts off access of the actuating fluid to the valve processing fluid flow control, thereby ending the venting with closing of the actuating fluid passageways to actuating fluid. In a preferred embodiment, a belleville spring, with a specific eversion pressure characteristic, operates in a fluid tight manner to move the pressure logic switch to direct flow of the actuating fluid to operable sites and which reverts to initial position upon pressure relief.

In another preferred embodiment of the present invention, the pressure relief system further comprises shuttle valve means, controlled by the actuating fluid, which, in turn, actuate valves to isolate the processing gas by shutting off both additional processing gas input and outlet. In such embodiment it is further preferred that the shuttle valves, with concomitant processing gas isolation, require a manual or other than automatic reset. This prevents system restart until the excessive pressure causing condition is rectified.

DETAILED DESCRIPTION OF THE DRAWINGS AND THE PREFERRED EMBODIMENT

Figure 1A:
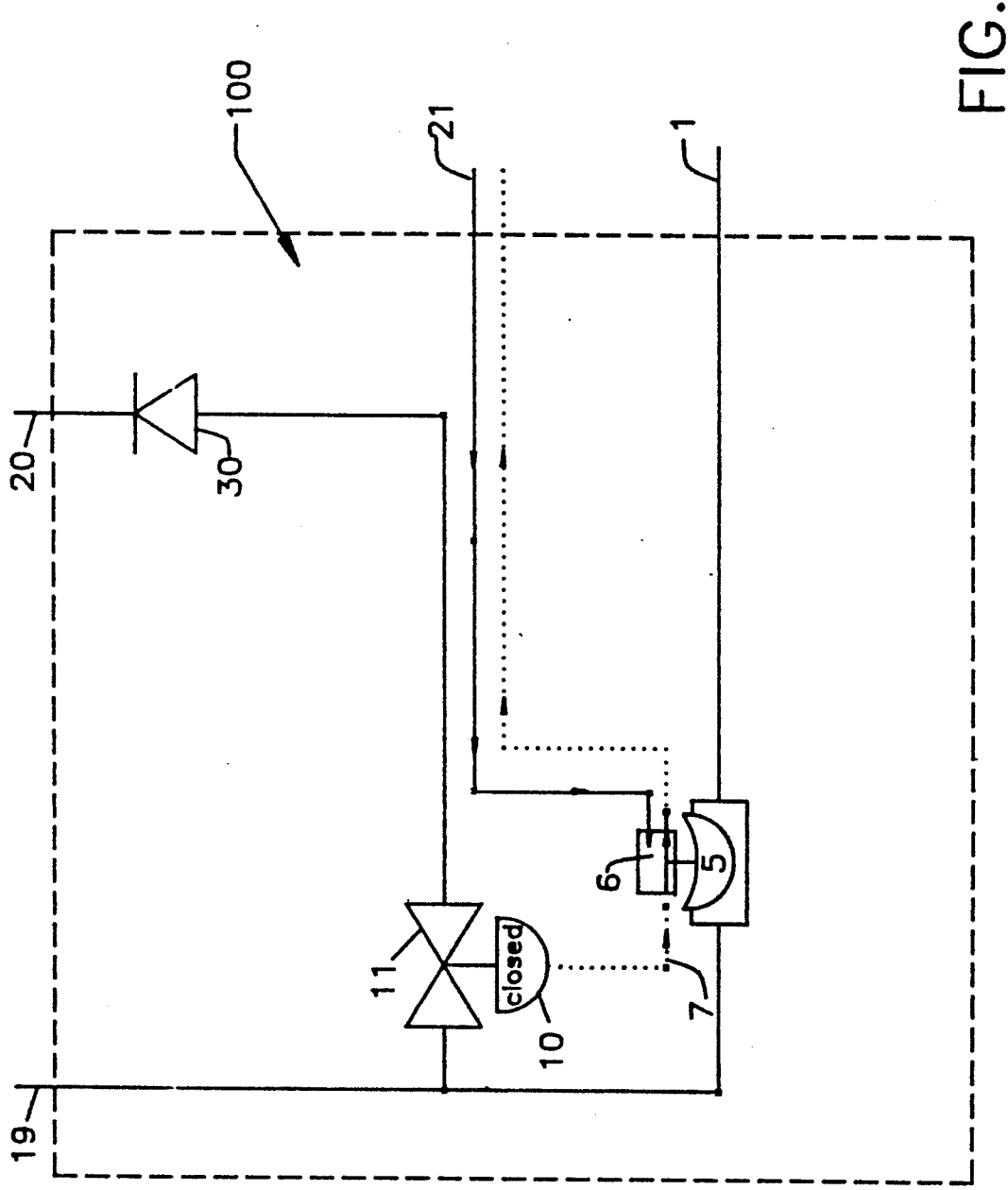
FIG. 1a is a schematic drawing of a system of the present invention showing a normal operating pressure condition.

With specific reference to the drawings, in FIG. 1a, a processing system 100, is shown with a pressure regulated processing gas 1, such as argon. In the drawings, dotted gas lines indicate the absence of pressurized actuating gas 21 in a gas passageway. Under normal operating conditions and pressure, the process gas 1 passes through pressure logic switch 6 to the processing gas outlet 19. Diaphragm relief member 10 is closed to prevent passage of gas 1 through valve 11 to the vent 20. Inlet of actuating gas 21 to diaphragm relief member 10 is blocked by pressure logic switch 6.

Figure 1B:
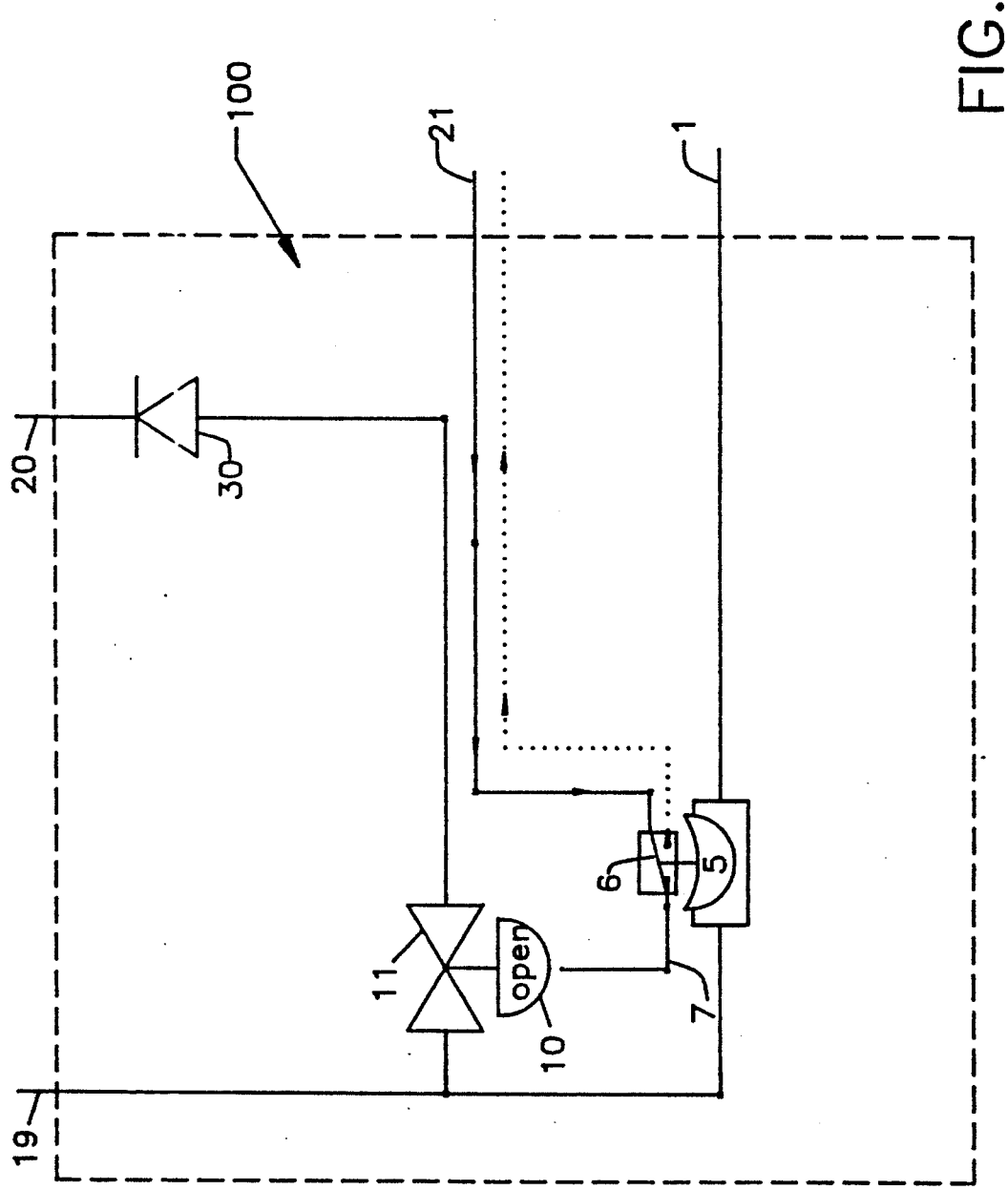
FIGURE 1b is a schematic drawing of the system of the present invention wherein an excessive pressure has been built up requiring venting, and such venting operation.

When the pressure of the processing gas 1 exceeds a predetermined level, as shown in FIG. 1b, pressure sensitive element 5 is activated to mechanically move the pressure logic element 6 to a position which provides access of actuating gas 21 to actuating line 7 to move diaphragm relief member 10 to the open position whereby processing gas can pass through valve 11 to vent 20. For high purity systems, check valve 30 prevents ingress of atmospheric impurities into the processing gas system 100, during such venting.

Figure 2:
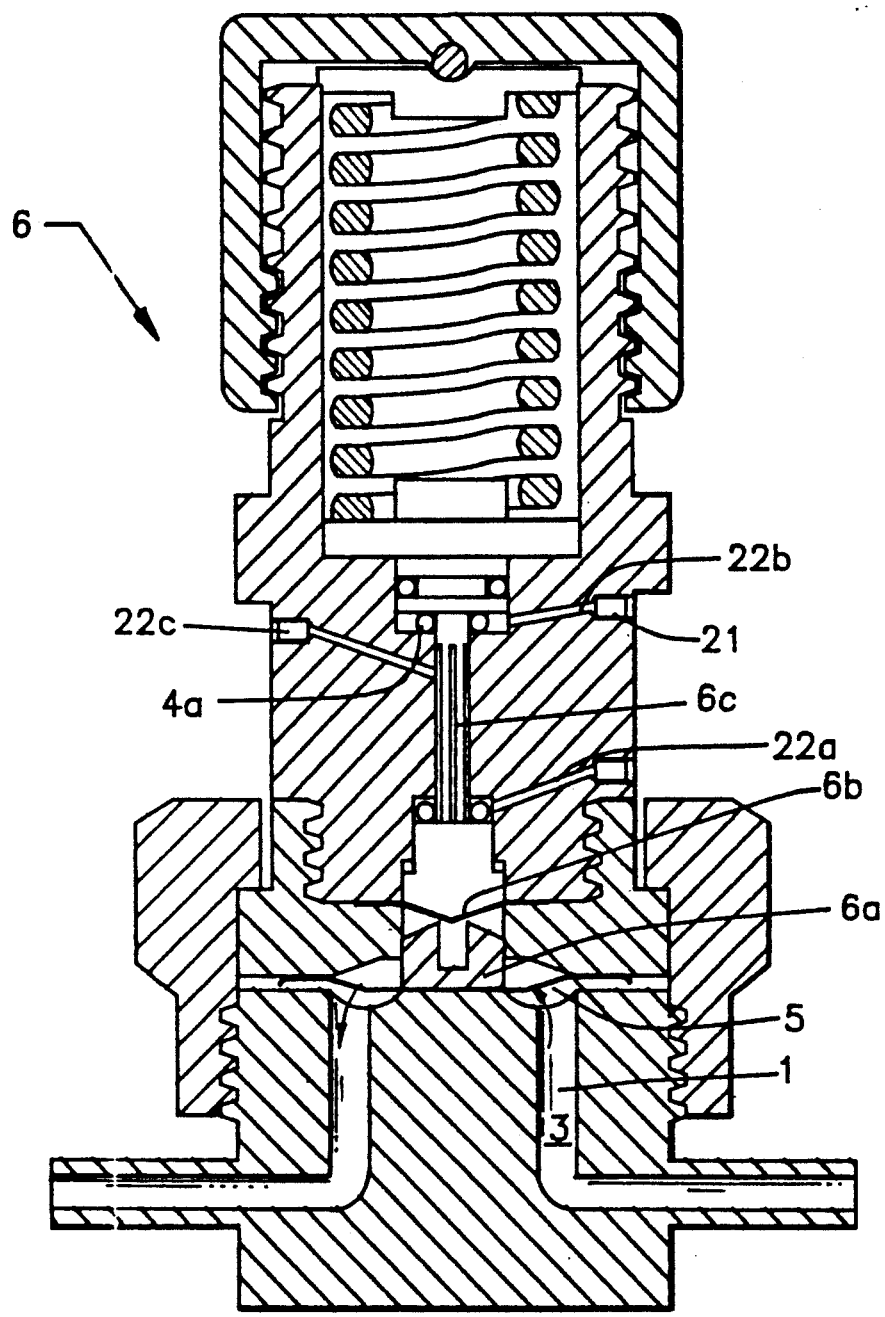
FIG. 2 is a cross section view of the pressure logic control member of the present invention.
Figure 3:
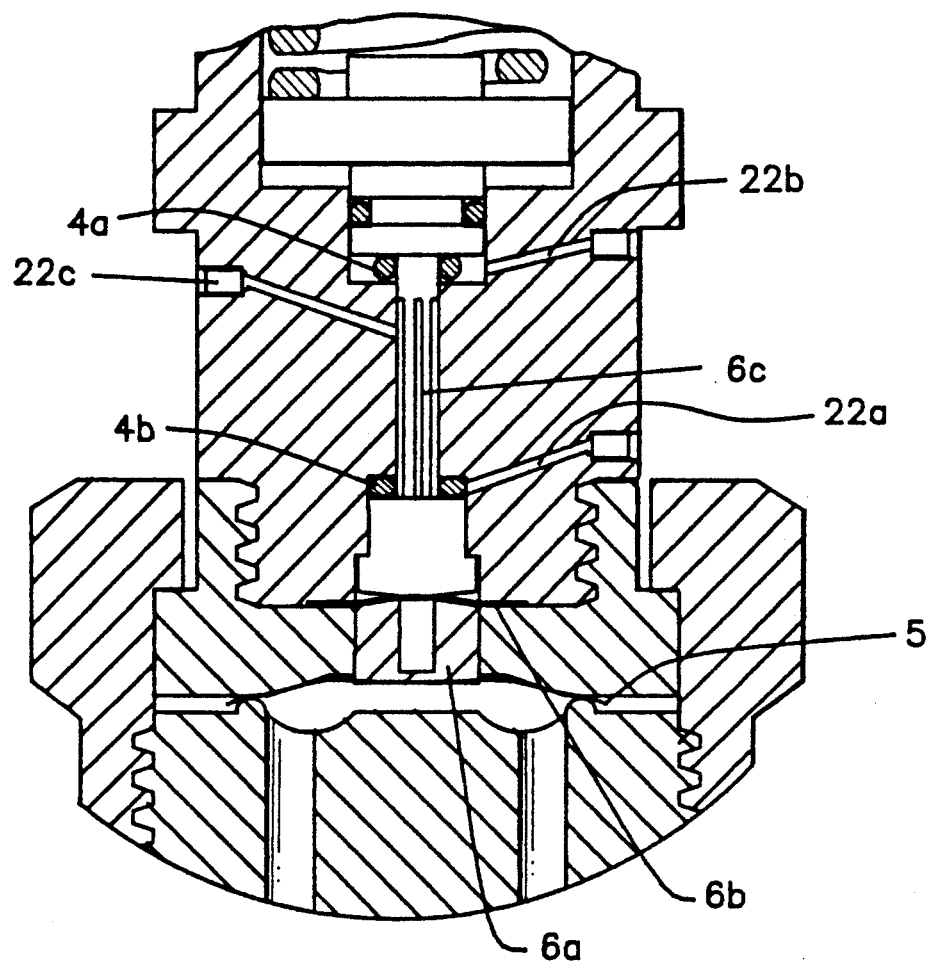
FIG. 3 is an enlarged cross section view of the pressure logic control member of FIG. 2, shown in the logic venting position.

The pressure logic element 6 is shown in more detail in FIGS. 2 and 3. In FIG. 2, pressure logic element 6 is shown in the normal operating position with processing gas 1 passing through passageway 3 in the direction shown by the arrow. Ring seal 4a blocks off access of the actuating gas 21. Under excess pressure of processing gas 1, pressure sensitive belleville spring 5 everts from its normal position shown in FIG. 2 into the everted position shown in FIG. 3. The everted position is held as long as the pressure remains above the eversion pressure, which is preselected to be the pressure at which venting is desired.

Spring member 5, upon eversion as shown in FIG. 3, engages plunger 6a, which in turn pushes snap ring 6b, to lift spool 6c. Elevation of spool 6c causes sealing closure of actuating gas vent 22a with seal ring 4b and, at the same time, moves ring seal 4a out of blockage of actuating gas inlet 22b whereby gas 21 accesses actuator port 22c to activate diaphragm relief member 10, as shown in FIG. 1b.

Relief of pressure by venting causes belleville spring 5 to evert to its original position as shown in FIG. 2, whereby actuating gas vent 22a is opened to purge the system of the actuating gas 21 and at the same time further ingress of actuating gas 21 is impeded. Metal spring member 5 hermetically seals the processing system and the actuating system from each other and provides a mechanical actuation not liable to electrical sparking, as is likely with electrical actuators.

Figure 4A:
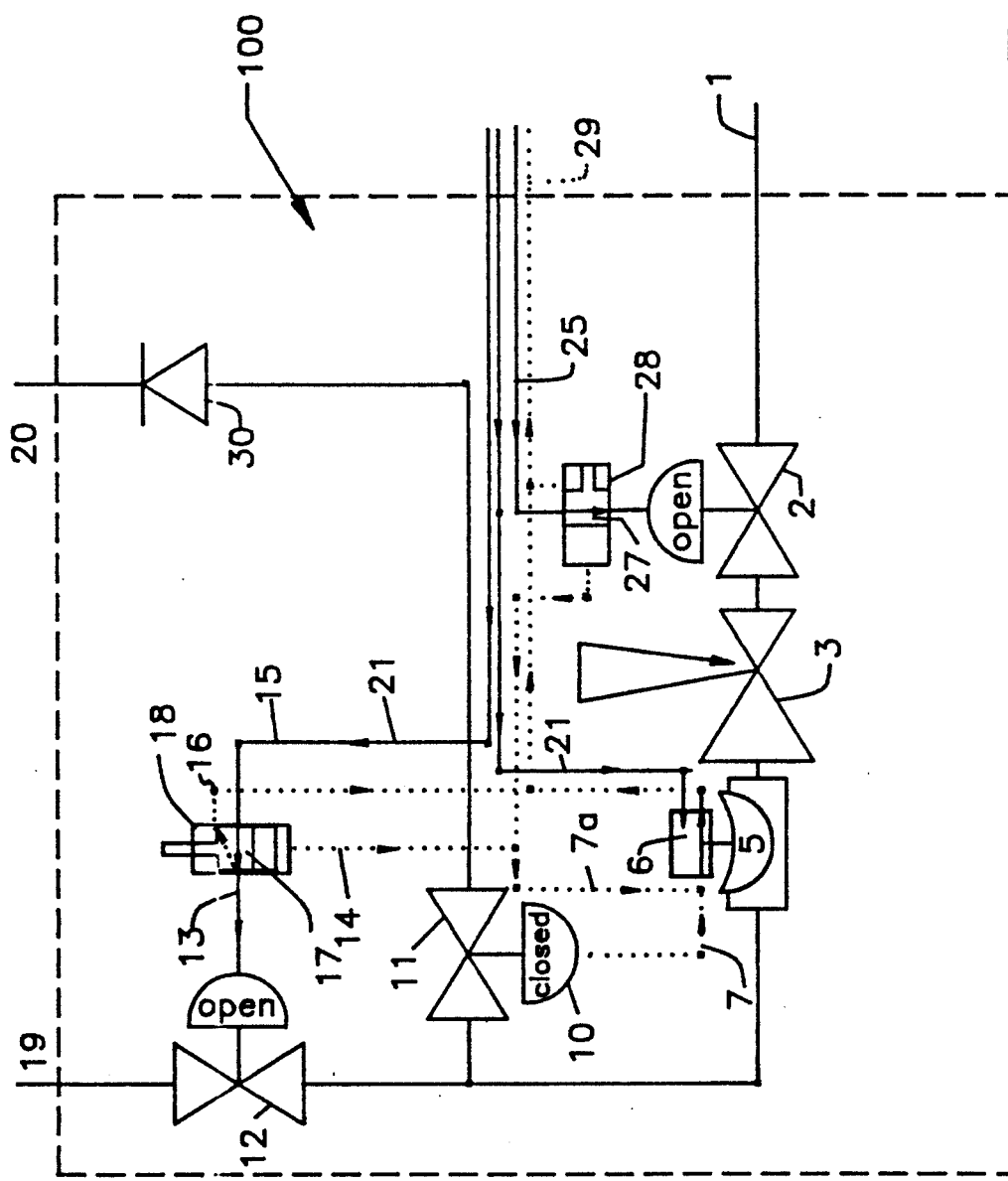
FIG. 4a is a schematic drawing of the normally operating system of the present invention wherein shuttle valves are utilized to isolate process gas input and outlet.
Figure 4B:
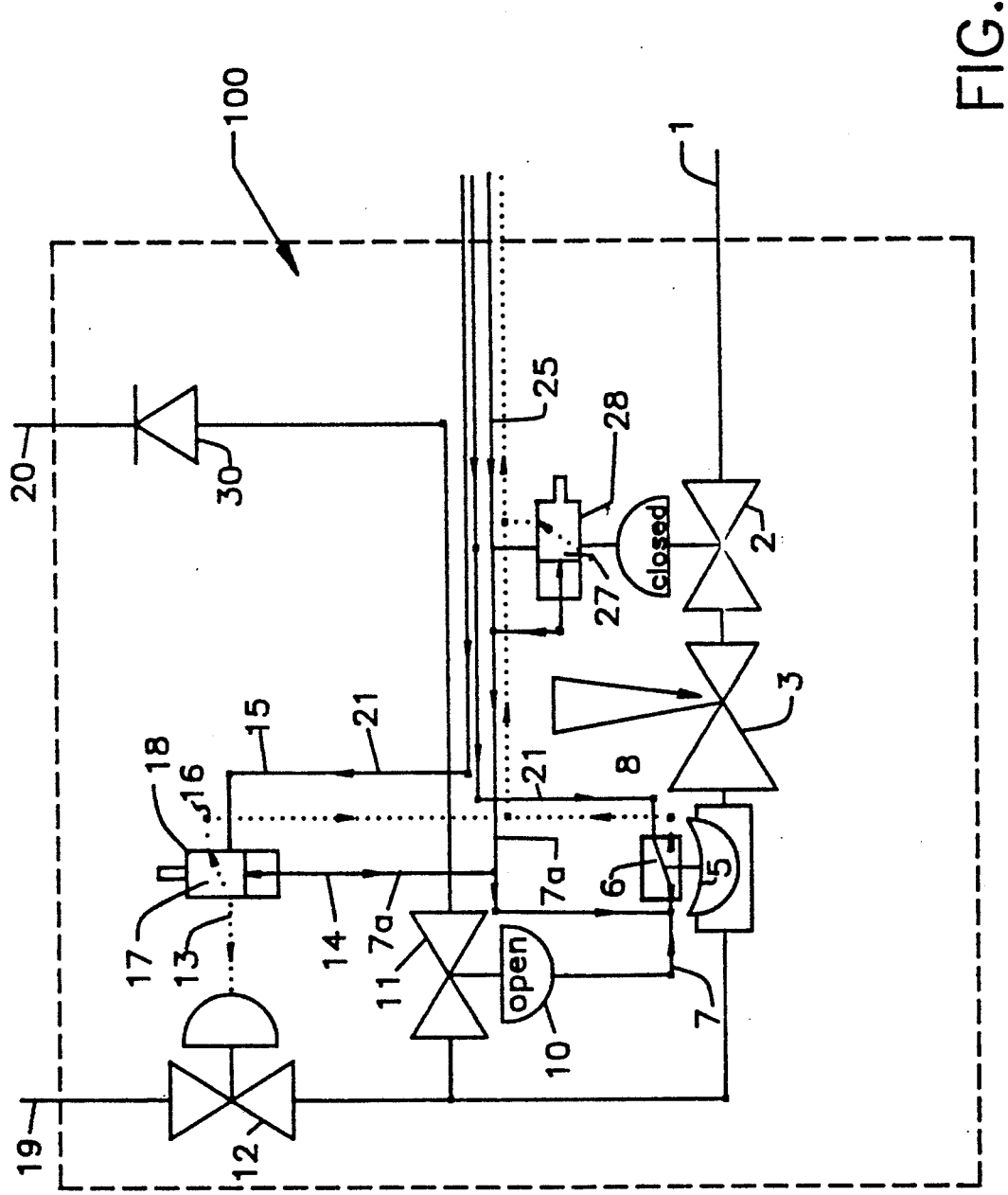
FIG. 4b is the system of FIG. 4a under set point pressure conditions and pressure relief activation.
Figure 4C:
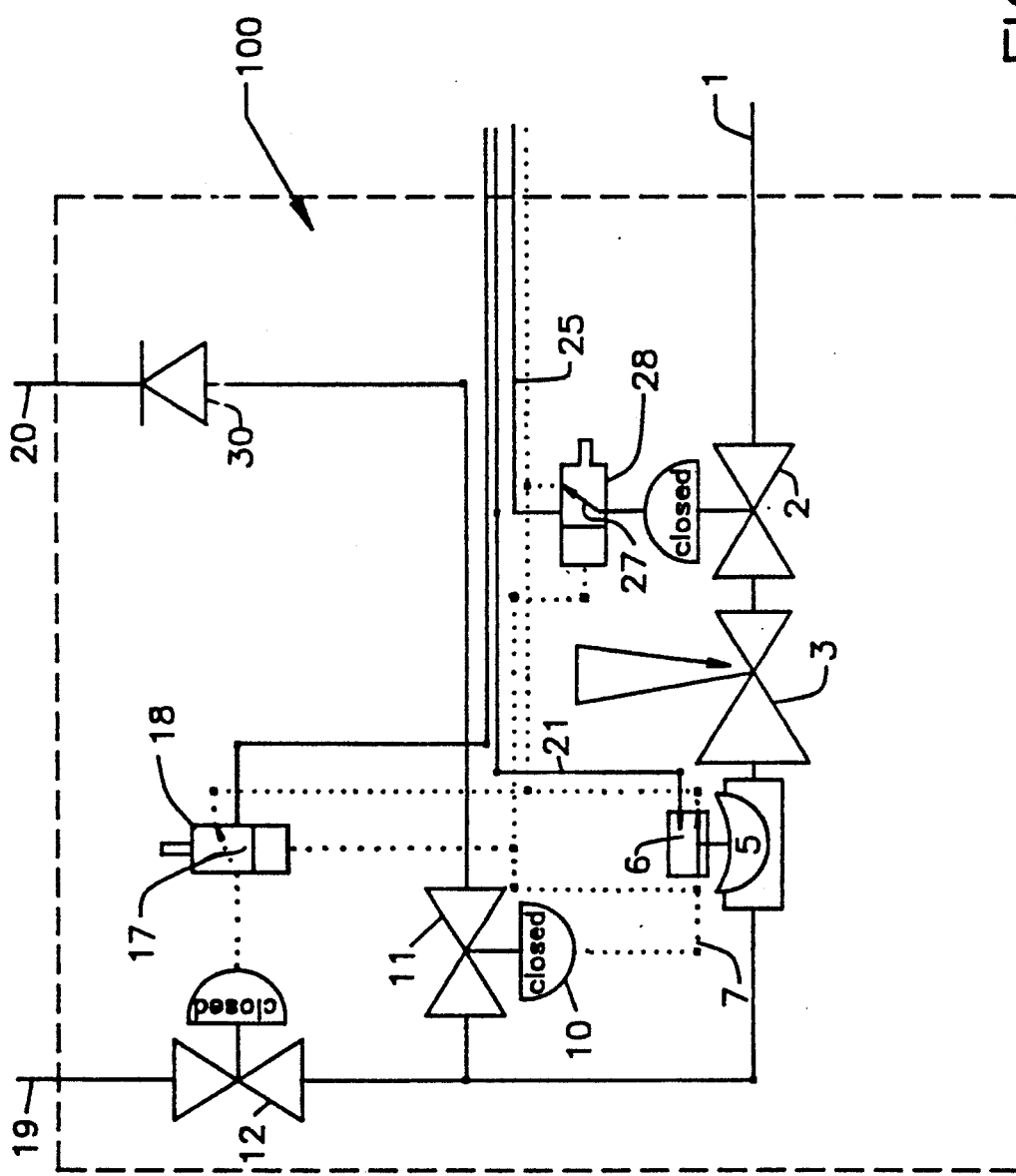
FIG. 4c is the system of FIGS. 4a and 4b after pressure relief and wherein the system requires resetting for continued operation.

FIGS. 4a-4c show the system 100 with shuttle valves 18 and 28 operatively associated with system isolation valve 12 and process gas supply isolation valve 2 respectively. In the condition of normal operating pressure as shown in FIG. 4a, venting valve 11 is in the closed position (isolating vent 20 from the processing system) and valves 2 and 12 are in the open position to allow ingress and egress of the processing gas. Additional actuating gas lines 15 and 25 carry the actuating gas through the respective shuttle valves 18 and 28 to keep valves 12 and 2 in the constantly open position.

As shown in FIG. 4b, under conditions of excessive pressure, such as caused by a defective pressure regulator 3, relief valve 11 is opened, as described above. In addition, actuating line 7a, tapped into vent actuating line 7, feeds into both shuttle valves 18 and 28. As a result, actuating-gas 21 enters into line 7a, and pushes the respective shuttles 17 and 27, of shuttle valves 18 and 28, into the closed position, thereby cutting off actuating gas pressure on the system isolation valve 12 and process supply isolation valve 2, respectively. The normally open valves 2 and 12 close, thereby shutting off further inflow and outflow of the processing gas, i.e., fully isolating the system.

As shown in FIG. 4c, with venting of process gas to return to normal pressure levels, diaphragm relief valve 11 closes, and pressure logic switch 6 returns to its normal position. Shuttles 17 and 27 however remain in their positions, thereby preventing system isolation valves 12 and 2 respectively from opening. Return of the shuttles to the normal operating positions requires a manual or otherwise instructed reset. This permits servicing of the system to discover any defective components, without, at the same time having the system undergo constant on/off venting cycles.

Figure 5A:
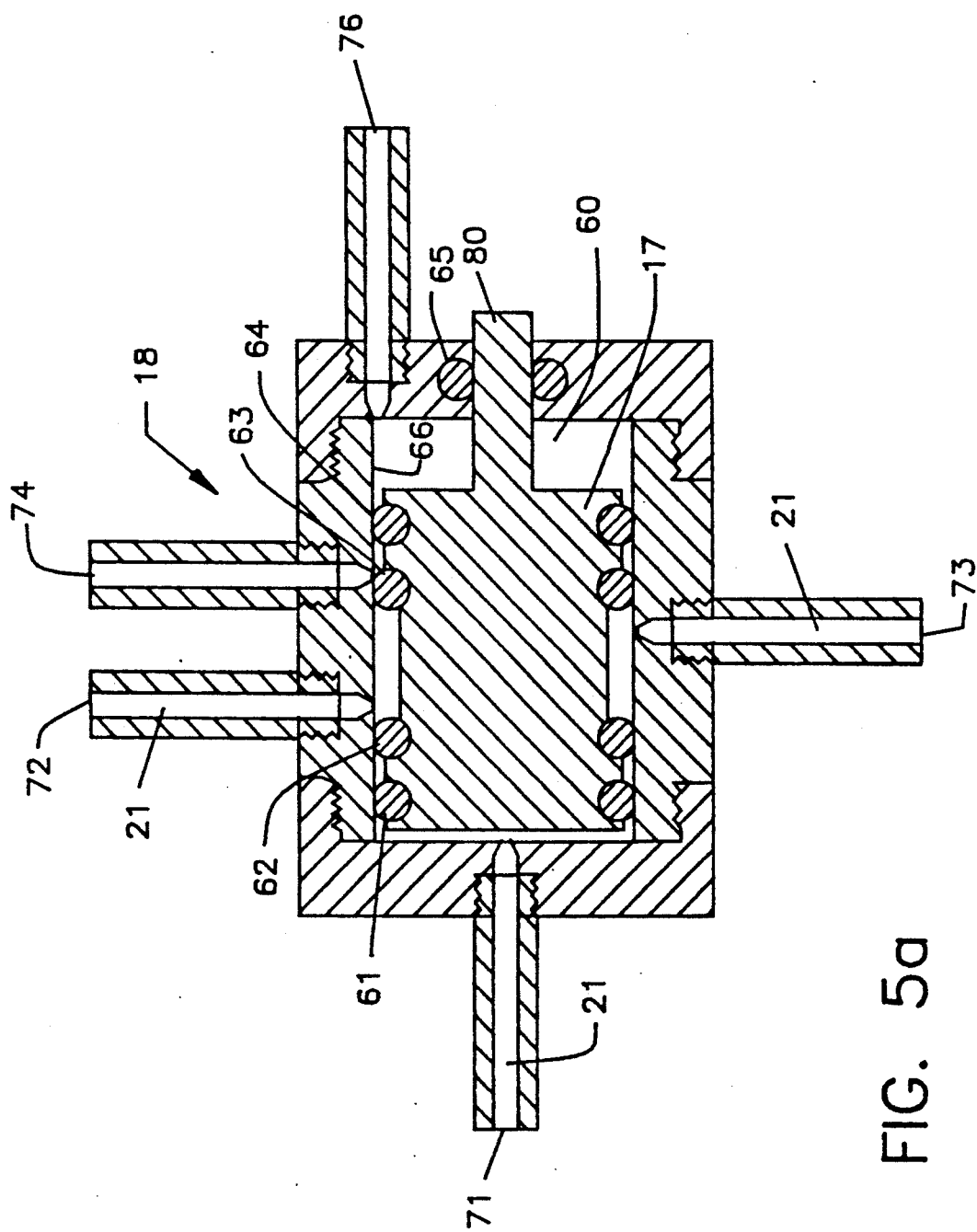
FIGS. 5a and 5b are cross sectional views of the shuttle valves of FIGS. 4a-4c in the closed and open positions respectively.

The shuttle valves 18 and 28 are identical in structure and are shown in their normal and activated positions respectively in FIGS. 5a and 5b (for clarity, reference hereinafter is made only to shuttle valve 18). Shuttle 17 is movable within enclosed area 60, with circumferential shuttle port seal 61, actuation inlet port seal 62, vent seal 63, reset seal 64 and manual reset seal 65, serving to sealingly isolate the shuttle from the walls 66 of the shuttle valve with appropriate spacing therebetween. Shuttle port 71 is connected to line 7a (see FIG. 4b), whereby activation of the pressure logic switch 6 allows actuation gas to enter the shuttle port 71 and to push shuttle 17 from the position shown in FIG. 5a to that of 5b. In the normal operating position shown in FIG. 5a, the actuating gas enters the shuttle valve 18 through actuation inlet port 72 and exits through actuation port 73 to, as shown in FIG. 4a, to maintain system isolation valve 12 in the open position for continued operation of the processing gas system 100.

Figure 5B:
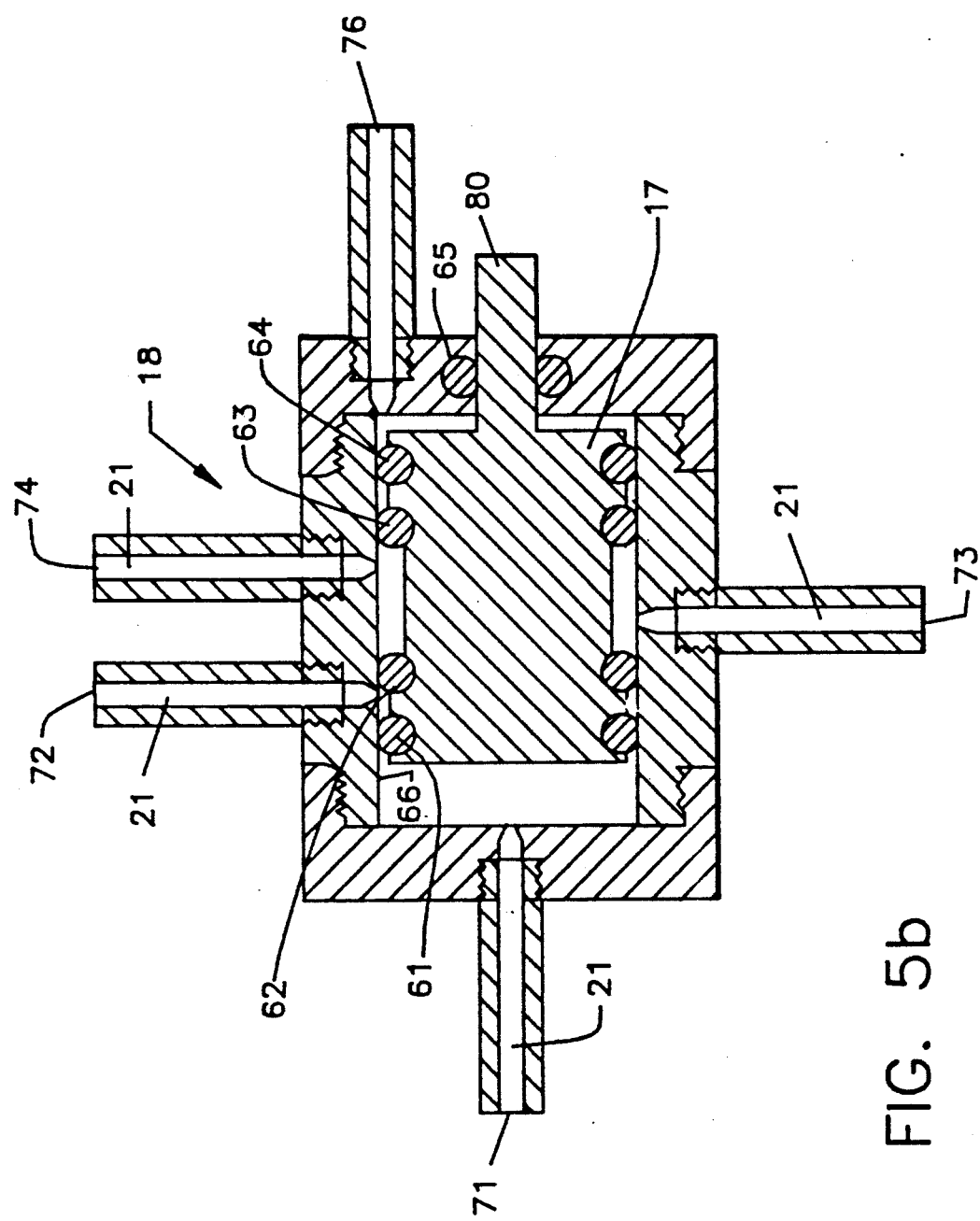

When the shuttle 17 is moved to the position shown in FIG. 5b, gas communication between actuation inlet port 72 and actuation port 73 is cut off by actuation inlet port seal 62. Instead, actuating gas 21, from actuation inlet port 72, is in communication with vent port 74. As a result, isolation valve 12 closes, to isolate the processing gas within the system (FIG. 4b). Shuttle valve 28 operates in an identical manner to close off valve 2, thereby preventing further processing gas 1 from entering the system.

The shuttle 17 remains in the position shown in FIG. 5b, with the condition as shown in FIG. 4c, even when the system pressure has returned to normal. This holds the processing system in a shut-down condition (no processing gas inlet or outlet) under the defective condition has been discovered and corrected. Reactivation of the system, with continued flow of the processing gas (both in and out) requires either manual pressure on manual reset button 80, or a reset gas pressure through reset port 76 (not shown in FIGS. 4a-4c). The manual or reset pressure moves shuttle 17 back to its normal position to activate the system isolation valve 12 into the open position (a similar manual or reset pressure is required with shuttle 27).

It is understood that the above description and drawings are only illustrative of the present invention and that changes can be made in the particular logic, venting, control and operation components, and the like, without departing from the scope of the present invention as defined in the following claims.

What is claimed is:

1. A mechanical pressure relief system for a processing system having a pressurized processing fluid flowing through processing fluid passageways, said pressure relief system comprising mechanical pressure logic switch means situated within the processing system, whereby the logic switch means is exposed to the pressurized processing fluid, said pressure relief system further comprising actuating fluid means; actuating fluid passageways, completely separate from the processing fluid passageways; and processing fluid vent valve control means, actuatable by said actuating fluid means; wherein the mechanical pressure logic switch means is activated, at a pre-determined set point pressure of the processing fluid above that of the normally pressurized processing fluid, to above access of the actuating fluid means to actuate the processing fluid vent valve control means, for venting of the processing fluid, wherein, with said venting and return of the processing system pressure to the set point pressure, the pressure logic switch means cuts off access of the actuating fluid to the processing fluid vent valve control means, thereby ending the venting and wherein said system further comprises shuttle valve control means, in operative association with a valve controlling the inlet of processing gas to the processing system, and in operative association with a valve controlling the outlet of processing gas from the processing system; wherein said shuttle valve control means is activated at the pre-determined set point pressure of the processing fluid, by the actuating fluid means, to close the valve controlling the inlet of processing fluid and to close the valve controlling outlet of the processing fluid from the processing system.

2. The pressure relief system of claim 1, wherein the valve controlling the inlet of processing gas and the valve controlling outlet of the processing gas from the processing system remain closed with the return of the processing gas to the set point pressure.

3. The pressure relief system of claim 2, wherein the shuttle valve control means comprises intentional reset means to effect opening of the valve controlling the inlet of processing gas and the valve controlling outlet of the processing gas from the processing system.

* * * * *